United States Patent
Lu et al.

(10) Patent No.: US 8,184,212 B2
(45) Date of Patent: May 22, 2012

(54) SOUND INTERMEDIATE FREQUENCY DEMODULATOR AND SOUND INTERMEDIATE FREQUENCY DETECTING METHOD THEREOF

(75) Inventors: Shih-Chuan Lu, Tainan County (TW); Tien-Ju Tsai, Tainan County (TW); Yen-Ming Lin, Tainan County (TW)

(73) Assignee: Himax Media Solutions, Inc., Tainan (TW)

( * ) Notice: Subject to any disclaimer, the term of this patent is extended or adjusted under 35 U.S.C. 154(b) by 450 days.

(21) Appl. No.: 12/510,270

(22) Filed: Jul. 28, 2009

(65) Prior Publication Data

US 2011/0025926 A1  Feb. 3, 2011

(51) Int. Cl.
   *H04N 5/60* (2006.01)
   *H04N 7/00* (2006.01)
(52) U.S. Cl. ........................................ 348/738; 348/486
(58) Field of Classification Search .................. 348/738
   See application file for complete search history.

(56) References Cited

U.S. PATENT DOCUMENTS 5,012,516 A * 4/1991 Walton et al. ...................... 381/3
2006/0154629 A1 * 7/2006 Zahm et al. .................... 455/136

* cited by examiner

*Primary Examiner* — Jefferey Harold
*Assistant Examiner* — Michael Teitelbaum
(74) *Attorney, Agent, or Firm* — Jianq Chyun IP Office

(57) ABSTRACT

A sound-IF demodulator including a first demodulating unit and a second demodulating unit and a sound-IF detecting method thereof are provided. A sound de-matrix unit is adapted to generate a driving signal by de-matrixing outputs of the sound-IF demodulator. The first demodulating unit generates a first demodulated signal to the sound de-matrix unit by demodulating the first carrier signal. The second demodulating unit detects the signal quality of the sound signal and generates a second demodulated signal to the sound de-matrix unit and/or the first demodulating unit by demodulating the second carrier signal. When the second demodulating unit is idle, the second demodulating unit is programmed to select a corresponding standard among a plurality of predetermined standards for the sound signal according to the signal quality of the sound signal, so that the sound-IF demodulator is programmed to demodulate the sound signal in the corresponding standard.

16 Claims, 4 Drawing Sheets

SOUND INTERMEDIATE FREQUENCY DEMODULATOR AND SOUND INTERMEDIATE FREQUENCY DETECTING METHOD THEREOF

BACKGROUND OF THE INVENTION

1. Field of the Invention

The present invention relates to a demodulator and a signal detecting method thereof, and more particularly to a sound intermediate frequency (sound-IF) demodulator and a sound-IF detecting method thereof.

2. Description of Related Art

Generally, the television system for each country will specify a number of channels within the UHF or VHF frequency ranges. A channel actually consists of two signals. One is the picture signal related the picture information transmitted using amplitude modulation on one frequency, and the other is the sound signal related to the sound information transmitted with frequency modulation (FM) at a frequency at a fixed offset (typically 4.5, 5.5, 6 or 6.5 MHz) from the picture signal.

In application of analog TV, a tuner selects one of the channels and frequency-shifts the signals to a fixed intermediate frequency (IF). Next, the IF signal is demodulated to a composite video broadcast signal (CVBS) and a sound signal by an IF demodulator. The FM sound signal is then demodulated and amplified by a sound-IF demodulator and used to drive a loudspeaker. Accordingly, if the sound-IF demodulator is exactly set to be matched with environment of source, the received signal can be demodulated perfectly.

However, the setting of the sound-IF demodulator may sometimes be mismatched with source signal in the real-world since the environment of source is changed. For example, for the TV program of china, the frequency deviation of modulated signal in commercial may be twice than the usual program. In this case, the sound-IF demodulator is set for usual program, and users endure the effect due to the wrong setting in commercial time, or the sound-IF demodulator is given a conservative setting, and users sacrifice the other program in the related art.

Furthermore, the environment of source may change among FM-mono, A2, and NICAM. Both of B/G signal and D/K signal are able to be transmitted through one of the above three methods. The environment of source may change after the sound-IF demodulator is set, and the sound-IF demodulator may be given a wrong setting for the environment of source.

SUMMARY OF THE INVENTION

Accordingly, the exemplary embodiments consistent with the present invention are directed to provide a sound-IF demodulator capable of being recovered from mismatched setting without additional hardware and a sound-IF detecting method thereof.

According to one exemplary embodiment consistent with the present invention, a sound-IF demodulator including a first demodulating unit and a second demodulating unit is provided. The sound-IF demodulator is adapted for an analog television (analog-TV) system and receives a sound signal having at least one of a first carrier signal and a second carrier signal. A sound de-matrix unit is adapted to generate a driving signal by de-matrixing outputs of the sound-IF demodulator. The first demodulating unit generates a first demodulated signal to the sound de-matrix unit by demodulating the first carrier signal. The second demodulating unit detects the signal quality of the sound signal and generates a second demodulated signal to the sound de-matrix unit and/or the first demodulating unit by demodulating the second carrier signal. When the second demodulating unit is idle, the second demodulating unit is programmed to select a corresponding standard among a plurality of predetermined standards for the sound signal according to the signal quality of the sound signal, so that the sound-IF demodulator is programmed to demodulate the sound signal in the corresponding standard.

According to one exemplary embodiment consistent with the present invention, a sound-IF detecting method for a sound-IF demodulator is provided. The sound-IF detecting method includes following steps: receiving a sound signal having at least one of a first carrier signal and a second carrier signal, detecting the signal quality of the sound signal; and selecting a corresponding standard among a plurality of predetermined standards for the sound signal according to the signal quality of the sound signal when the signal quality meets a idle condition, so that the sound-IF demodulator is programmed to demodulate the sound signal in the corresponding standard.

In the sound-IF demodulator, a suitable sound-IF detecting method is provided. The idle second demodulating unit is programmed to detect what standard the sound signal is in, so that the sound-IF demodulator is programmed to demodulate the sound signal in the corresponding standard. Meanwhile, while the corresponding detecting mode proceeds, the sound path of the second demodulating unit coupled to the first demodulating unit and the de-matrix unit are cut. Accordingly, the demodulating process in the first demodulating unit is not affected by the detecting process in the idle second demodulating unit. Therefore, the sound-IF demodulator is capable of being recovered from mismatched setting without additional hardware, and further, additional cost for detecting is unnecessary.

In order to make the features of the present invention comprehensible, exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments consistent with the present invention, and together with the description, serve to explain the principles of the invention.

DESCRIPTION OF EMBODIMENTS

Figure 1:
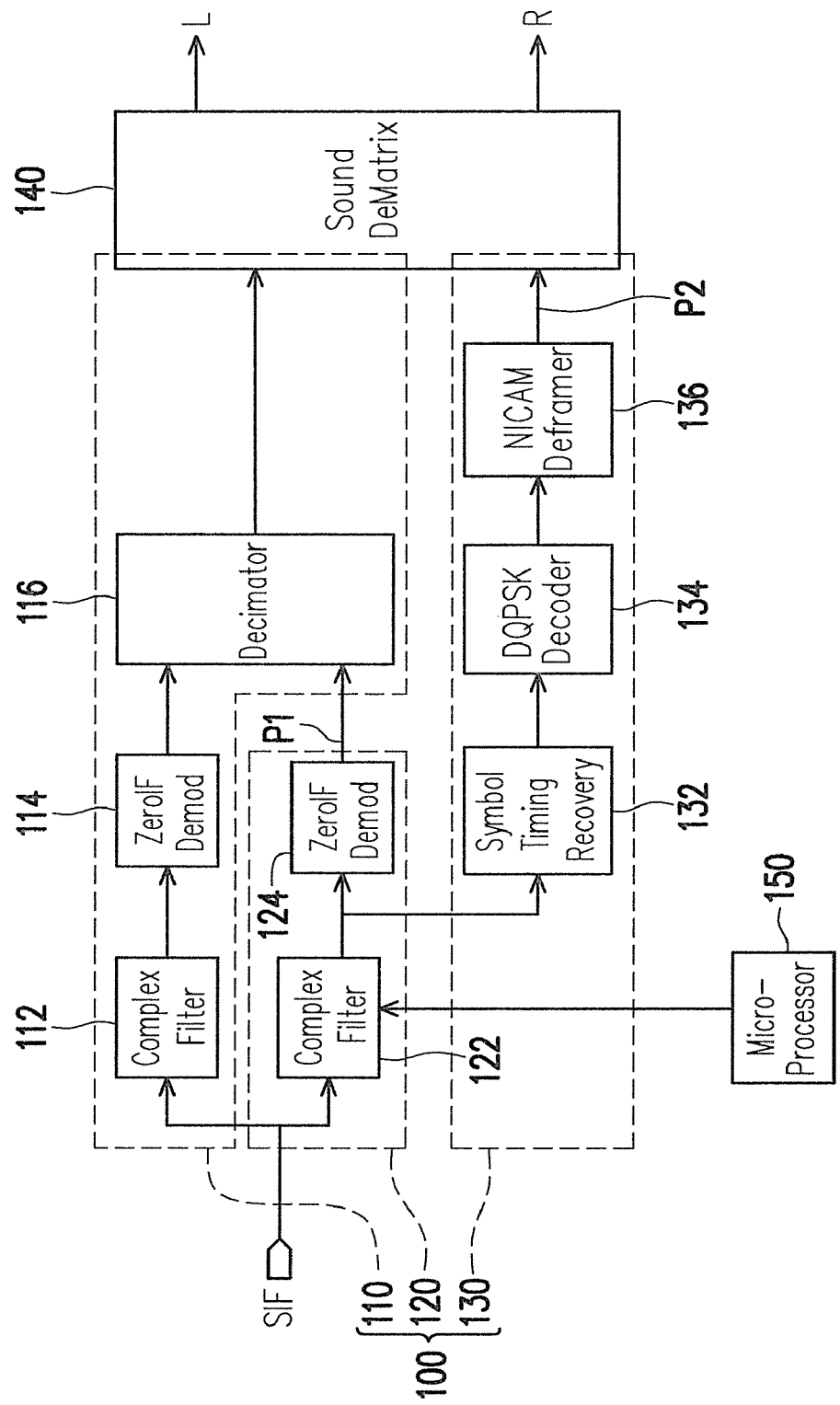
FIG. 1 is a block diagram of an analog-TV sound-IF demodulator according to an exemplary embodiment consistent with the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of an analog-TV sound-IF demodulator according to an exemplary embodiment consistent with the present invention. Referring to FIG. 1, in the present embodiment, the sound-IF demodulator 100 includes two analog demodulators 110 and 120 and one NICAM digital demodulator 130. In the other embodiment, there are simply two analog demodulators in the sound-IF demodulator for cost issue.

Specifically, the sound-IF demodulator 100 is adapted to receive a sound signal SIF. Generally, the sound signal SIF has a main-carrier signal and a sub-carrier signal, wherein the main-carrier signal is related to the primary sound information, and the sub-carrier signal is related to the other sound information except for the sound information to which the main-carrier signal is related, such as bilingual broadcast or stereo. For example, in A2 stereo system, the sound signal SIF has an analog main-carrier signal and an analog sub-carrier signal, but in NICAM stereo system, the sound signal SIF has an analog main-carrier signal and a digital sub-carrier signal. It should be noted that the sound signal SIF in FM-mono transmission simply has an analog main-carrier signal without any sub-carrier signal.

When the sound-IF demodulator 100 receives the sound signal SIF, the main-carrier signal is demodulated by the analog demodulator 110, so that a first demodulated signal (not shown) is generated to the sound de-matrix unit 140. Meanwhile, the sub-carrier signal is demodulated by the analog demodulator 120 or the NICAM digital demodulator 130 according to the sub-carrier signal format, such as analog or digital. That is, when the sub-carrier signal format is analog, the sub-carrier signal is demodulated by the analog demodulator 120, and a second demodulated signal (not shown) is then generated to a decimator 116 through a sound path P1. Alternatively, when the sub-carrier signal format is digital, the sub-carrier signal is demodulated by the NICAM digital demodulator 130. After that, the demodulated second demodulated signal (not shown) is directly generated to a sound dematrix 140 through a sound path P2. Accordingly, after the sub-carrier signal is demodulated by the analog demodulator 120 or the NICAM digital demodulator 130, the second demodulated signal is correspondingly outputted to the decimator 116 or the sound dematrix 140. In other embodiment, the second demodulated signal may be outputted to the decimator 116 and the sound dematrix 140 according to the design of the sound-IF demodulator.

In the analog demodulator 110, the received main-carrier signal is first filtered by a complex filter 112, and the complex filter 112 outputs a filtered result corresponding to the main-carrier signal. Next, a zero-IF demodulator 114 receives the filtered main-carrier signal, and the filtered main-carrier signal is converted to a zero-IF signal at baseband. Thereafter, the zero-IF baseband signal is processed by the decimator 116 and outputted to the sound dematrix 140. Accordingly, the sound dematrix 140 outputs a corresponding driving signal (including output signals L and R) to drive a loudspeaker (not shown).

Similarly, the received sub-carrier signal is demodulated, amplified, and used to drive the loudspeaker after being processed by the analog demodulator 120 or the NICAM digital demodulator 130 and the sound dematrix 140. It should be noted that, after being processed by the analog demodulator 120, the processed sub-carrier signal, i.e. the second demodulated signal, is outputted to the decimator 116, so that the second demodulated signal are also processed by the decimator 116. As a result, an output of the decimator 116, the first demodulated signal, further includes the information of the received sub-carrier signal.

In the present embodiment, a complex filter 122 is switched to process the analog sub-carrier signal or the digital sub-carrier signal by a microprocessor 150 according to the sub-carrier signal format. Those skilled in the art realize the operation of the said components in sound-IF demodulator 100, so that details related to the demodulation in sound-IF demodulator 100 are not described herein.

Generally, when a television is turned on, the channels are scanned, so that the environment of source corresponding to each of the channels is recorded in the TV. As a result, when the TV is switched to one of the channels, it is set to the corresponding environment of source. If the sound-IF demodulator 100 is exactly set to be matched with environment of source, such as FM-mono, A2, or NICAM, the received sound signal SIF is demodulated perfectly. If not, there is simply one analog demodulator 110 activated, and the analog demodulator 120 and the NICAM digital demodulator 130 are idle or just fool around. Accordingly, a suitable sound-IF detecting method is provided in the sound-IF demodulator according to an exemplary embodiment consistent with the present invention. When the setting of the sound-IF demodulator 100 is mismatched with the environment of source, the sound paths PI and P2 in FIG. 1 are cut, so that the sound-IF detecting method proceeds. Meanwhile, the activated analog demodulator 110 still works. The sound-IF demodulator is configured as FIG. 2.

Figure 2:
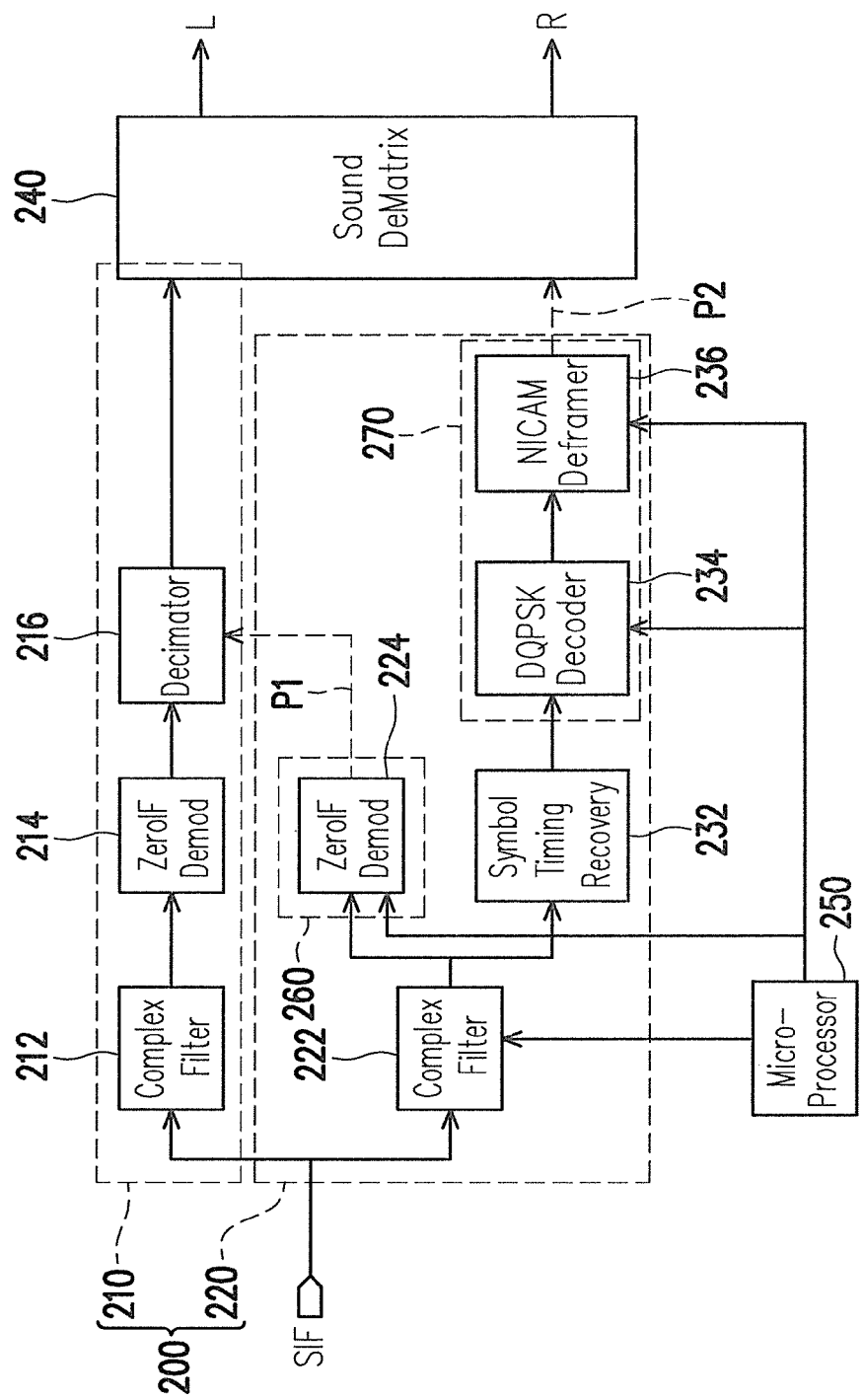
FIG. 2 is a block diagram of an analog-TV sound-IF demodulator according to another exemplary embodiment consistent with the present invention.

FIG. 2 is a block diagram of an analog-TV sound-IF demodulator according to another exemplary embodiment consistent with the present invention. Referring to FIG. 2, in the present embodiment, the sound-IF demodulator 200 includes a first demodulating unit 210 (the analog demodulator 110 in FIG. 1) for the main-carrier signal and a second demodulating unit 220 (the analog demodulator 120 and the NICAM digital demodulator 130 in FIG. 1) for the sub-carrier signal, wherein the cut sound paths P1 and P2 are drawn with dotted lines. Generally, the second demodulating unit 220 is coupled to the first demodulating unit 210, and the sound-IF demodulator 200 is configured as the sound-IF demodulator 100 shown in FIG. 1. When the setting of the sound-IF demodulator is mismatched with environment of source, the second demodulating unit 220 is idle or fool around. Meanwhile, the sound paths P1 and P2 are cut, and the second demodulating unit 220 is programmed to a sub-carrier detection mode or a high deviation (HDEV) detection mode, e.g. frequency deviation, so that the sound-IF detecting method proceeds. As a result, the sound-IF demodulator 200 is programmed to demodulate the sound signal in a corresponding standard, such as FM-mono, A2, or NICAM according to a detecting result in the sub-carrier detection mode or the HDEV detection mode, and the cut sound paths P1 and P2 of the second demodulating unit 220 are respectively connected to the first demodulating unit 210 and a sound dematrix 240 which outputs a corresponding driving signal (including output signals L and R) to drive a loudspeaker (not shown). Accordingly, the sound-IF demodulator 200 is recovered from the mismatched setting by the sound-IF detecting method proceeding in the second demodulating unit 220. That is, the sound-IF demodulator is capable of being recovered from mismatched setting without additional hardware. The sound-IF detecting method is specifically described in following.

Figure 3:
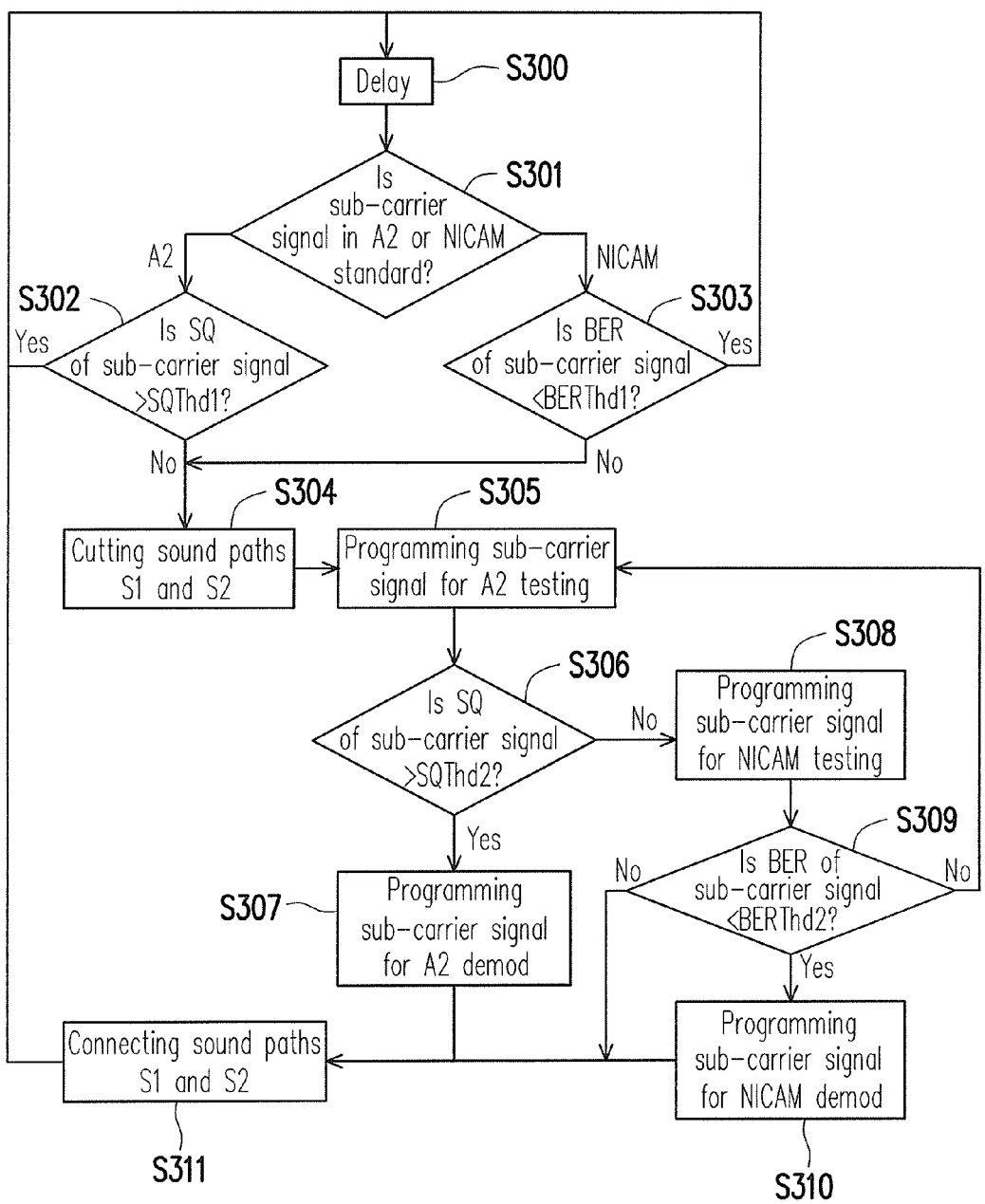
FIG. 3 is a flowchart of the sub-carrier detection mode of the sound-IF detecting method provided in the sound-IF demodulator according to an exemplary embodiment consistent with the present invention.
Figure 4:
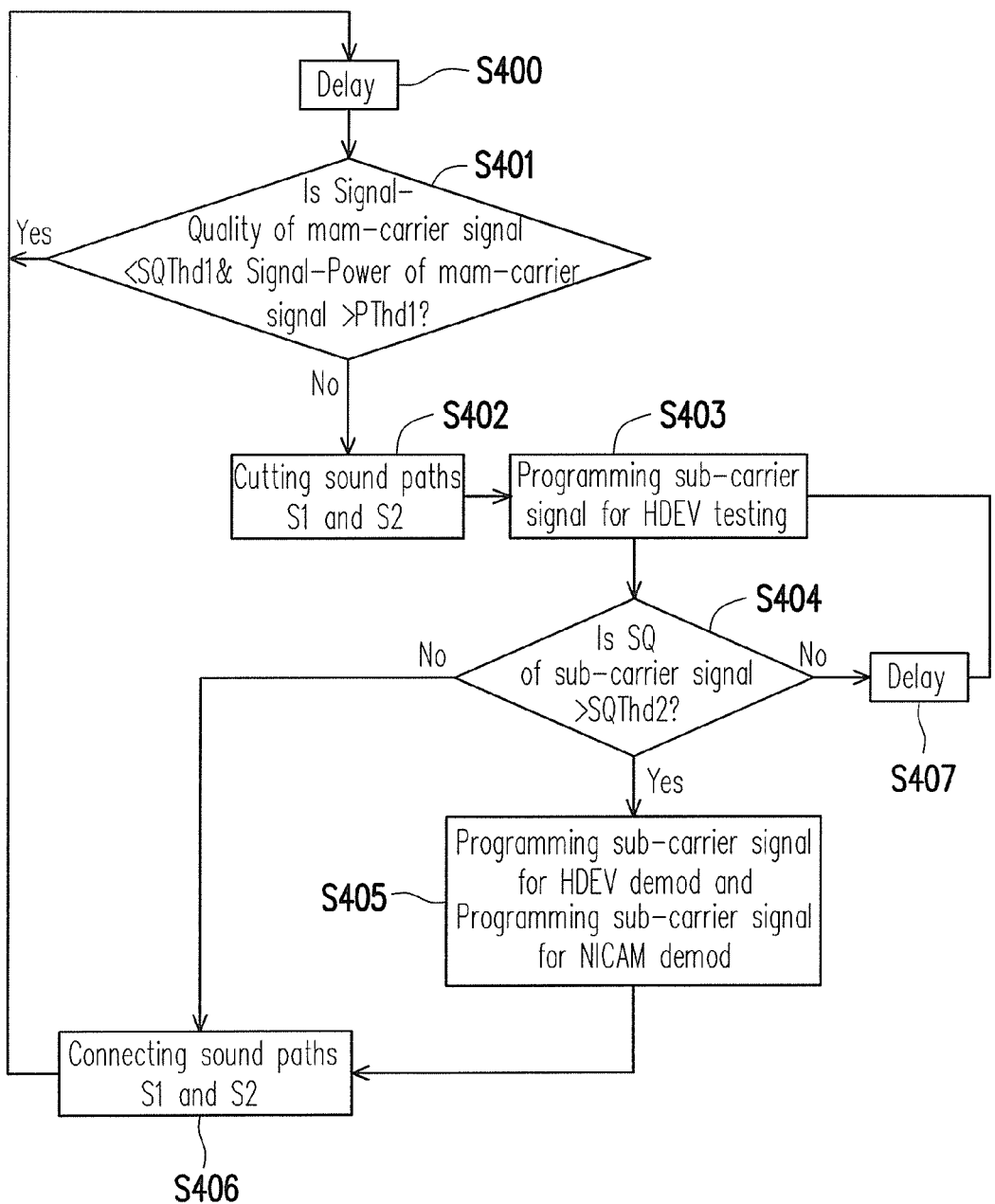
FIG. 4 is a flowchart of the HDEV detection mode of the sound-IF detecting method provided in the sound-IF demodulator according to an exemplary embodiment consistent with the present invention.

FIG. 3 and FIG. 4 are respectively flowcharts of the sub-carrier detection mode and the HDEV detection mode of the sound-IF detecting method provided in the sound-IF demodulator 200 according to an exemplary embodiment consistent with the present invention. Referring to FIGS. 2-4, in the present embodiment, a first testing unit 260 is programmed to execute the sub-carrier detection mode, and a second testing unit 270 is programmed to execute the HDEV detection mode. As shown in FIG. 2, the first testing unit 260 is a zero-IF demodulator 224, and the second testing unit 270 includes a DQPSK decoder 234 and a NICAM deframer 236. It should be noted that the first testing unit 260 and the second testing unit 270 are illustrated as an exemplary embodiment, but it does not limit to the scope of the present invention.

Referring to FIGS. 2-3, in the sub-carrier detection mode, when the sound-IF demodulator 200 is set to demodulate the sound signal SIF in A2 standard in step S301, the first testing unit 260 is programmed to detect the sub-carrier signal in step S302. That is, the first testing unit 260 is programmed to determine whether the signal quality (SQ), such as signal-to-noise ratio (SNR), of the sub-carrier signal is larger than a first SQ threshold SQThd1 or not in step S302. If the SQ of the sub-carrier signal is larger than the first SQ threshold SQThd1 in step S302, it means that the sub-carrier detection mode does not have to proceed, so that the sub-carrier detection mode sleeps for a period in step S300.

On the contrary, when the sound-IF demodulator 200 is set to demodulate the sound signal SIF in NICAM standard in step S301, the second testing unit 270 is programmed to detect the sub-carrier signal in step S303. That is, the second testing unit 270 is programmed to determine whether the bit error rate (BER) of the sub-carrier signal is smaller than a first BER threshold BERThd1 or not in step S303. Similarly, if the BER of the sub-carrier signal is smaller than the first BER threshold BERThd1 in step S303, it also means that the sub-carrier detection mode does not have to proceed, so that the sub-carrier detection mode sleeps for the period in step S300. In the present embodiment, the sub-carrier detection mode proceeding all the time is unnecessary. The sound-IF detecting method is selectively activated while being needed.

Furthermore, if the SQ of the sub-carrier signal is smaller than the first SQ threshold SQThd1 in step S302, or if the BER of the sub-carrier signal is larger than the first BER threshold BERThd1 in step S303, the sound paths P1 and P2 are cut in step S304. Next, the second demodulating unit 220 is programmed for A2 testing under control of a microprocessor 250 in step S305. In the present embodiment, a complex filter 222 and the zero-IF demodulator 224, i.e. the first testing unit 260, are simply programmed for A2 testing. The complex filter 222 is programmed to filter the analog sub-carrier signal.

For example, when the sound-IF demodulator 200 is set to demodulate the sound signal SIF in A2 standard in step S301, the second demodulating unit 220, however, receives a digital sub-carrier signal in NICAM standard. The SQ of the digital sub-carrier signal in NICAM standard is naturally smaller than the first SQ threshold SQThd1 in step S302. Accordingly, the sound paths P1 and P2 are cut in step S304, and further, A2 testing proceeds in step S305. Meanwhile, the activated first demodulating unit 210 still works without being affected by the second demodulating unit 220 due to the cut sound paths P1 and P2.

Referring to FIGS. 2-3, when the first testing unit 260 is programmed for A2 testing under control of the microprocessor 250 in step S305, the first testing unit 260 determines whether the SQ of the sub-carrier signal is larger than a second SQ threshold SQThd2 or not in step S306 (the second SQ threshold SQThd2 may be larger than the first SQ threshold SQThd1). If the SQ of the sub-carrier signal is larger than the second SQ threshold SQThd2 in step S306, it means that the sub-carrier signal in A2 standard is confirmed, and further, the sound-IF demodulator 200 is programmed to be matched with A2 standard in step S307. Accordingly, the cut sound paths P1 and P2 of the second demodulating unit 220 are respectively connected to the first demodulating unit 210 and the sound dematrix 240 in step S311, so that the sound-IF demodulator 200 is configured as the sound-IF demodulator 100 shown in FIG. 1. The sub-carrier detection mode sleeps for the period in step S300.

On the contrary, if the SQ of the sub-carrier signal is smaller than the second SQ threshold SQThd2 in step S306, the second demodulating unit 220 is programmed for NICAM testing under control of the microprocessor 250 in step S308. In the present embodiment, the complex filter 222, a symbol timing recovery 232, the DQPSK decoder 234, and the NICAM deframer 236 are simply programmed for NICAM testing. The complex filter 222 is switched to filter the digital sub-carrier signal under control of the microprocessor 250. When the second testing unit 270, i.e. the DQPSK decoder 234 and the NICAM deframer 236, is programmed for NICAM testing under control of the microprocessor 250 in step S308, the second testing unit 270 determines whether the BER of the sub-carrier signal is smaller than a second BER threshold BERThd2 or not in step S309. If the BER of the sub-carrier signal is smaller than the second BER threshold BERThd2 in step S309, it means that the sub-carrier signal in NICAM standard is confirmed, and further, the sound-IF demodulator 200 is programmed to be matched with NICAM standard in step S310. Accordingly, the cut sound paths P1 and P2 of the second demodulating unit 220 are respectively connected to the first demodulating unit 210 and the sound dematrix 240 in step S311, so that the sound-IF demodulator 200 is configured as the sound-IF demodulator 100 shown in FIG. 1. The sub-carrier detection mode sleeps for the period in step S300. In the present embodiment, the second BER threshold BERThd2 is smaller than the first BER threshold BERThd1, so that the sub-carrier signal in NICAM standard is confirmed indeed.

However, if the BER of the sub-carrier signal is determined to be larger than the second BER threshold BERThd2 in step S309, the second demodulating unit 220 programmed for NICAM testing is selectively programmed for A2 testing in step S305 again or to stop NICAM testing. When the second demodulating unit 220 is programmed for A2 testing in step S305 again, the loop of the steps S305, S306, S308, and S309 is repeated. In the present embodiment, when the loop of the steps S305, S306, S308, and S309 is repeated, the sound-IF demodulator 200 may be switched to the HDEV detection mode. Moreover, when the second demodulating unit 220 is programmed to stop NICAM testing, the cut sound paths P1 and P2 of the second demodulating unit 220 are respectively connected to the first demodulating unit 210 and the sound dematrix 240 in step S311, so that the sound-IF demodulator 200 is configured as the sound-IF demodulator 100 shown in FIG. 1. The sub-carrier detection mode sleeps for the period in step S300.

Referring to FIGS. 2 and 4, in the HDEV detection mode, the second demodulating unit 220 is programmed to a large deviation to evaluate the received sound signal SIF. Herein, the second demodulating unit 220, for example, evaluates the sound signal SIF in FM-mono standard. In the present embodiment, the complex filter 222 and the zero-IF demodulator 224, i.e. the first testing unit 260, are simply programmed to evaluate the signal quality, such as SNR, and the power of the main-carrier signal in step S401. Meanwhile, the complex filter 222 is programmed to filter the analog sound signal SIF. In step S401, the first testing unit 260 is programmed by microprocessor 250 to determine whether the signal quality of the main-carrier signal is smaller than the first SQ threshold SQThd1 or not and whether the power of the first carrier signal is larger than a power threshold PThd or not.

If the SQ of the main-carrier signal is smaller than the first SQ threshold SQThd1, and the power of the first carrier signal is larger than the power threshold PThd, it means that the HDEV detection mode does not have to proceed, so that the HDEV detection mode sleeps for the period in step S400. In the present embodiment, the HDEV detection mode proceeding all the time is unnecessary. The sound-IF detecting method is selectively activated while being needed. If not, the sound paths P1 and P2 are cut in step S402, and further, the first testing unit 260 is programmed to proceeds HDEV testing for the sub-carrier signal in step S403. Accordingly, the activated first demodulating unit 210 still works without being affected by the second demodulating unit 220 due to the cut sound paths P1 and P2.

In step S404, the first testing unit 260 is programmed by microprocessor 250 to determine whether the SQ of the sub-carrier signal is larger than the second SQ threshold SQThd2 or not. If the SQ of the sub-carrier signal is larger than the second SQ threshold SQThd2 in step S404, the sound-IF demodulator 200 is programmed to HDEV demodulation for the main-carrier signal of the sound signal SIF and to NICAM demodulation for the sub-carrier signal of the sound signal SIF in step S405. Accordingly, the cut sound paths P1 and P2 of the second demodulating unit 220 are respectively connected to the first demodulating unit 210 and the sound dematrix 240 in step S406, so that the sound-IF demodulator 200 is configured as the sound-IF demodulator 100 shown in FIG. 1. The HDEV detection mode sleeps for the period in step S400.

It should be noted that since the sound signal SIF in FM-mono standard simply has the main-carrier signal without the sub-carrier signal, the sound-IF demodulator 200 is programmed to NICAM demodulation for the sub-carrier signal in advance in step S405 in the present embodiment. In other embodiments, the sound-IF demodulator 200 may be programmed to A2 demodulation for the sub-carrier signal in advance in step S405.

However, if the SQ of the sub-carrier signal is determined to be smaller than the second SQ threshold SQThd2 in step S404, the second demodulating unit 220 programmed for HDEV testing is selectively programmed to sleep for the period in step S407 or to stop HDEV testing. When the second demodulating unit 220 is programmed to stop HDEV testing, the cut sound paths P1 and P2 of the second demodulating unit 220 are respectively connected to the first demodulating unit 210 and the sound dematrix 240 in step S406, so that the sound-IF demodulator 200 is configured as the sound-IF demodulator 100 shown in FIG. 1. The HDEV detection mode sleeps for the period in step S400. Moreover, when the second demodulating unit 220 is programmed to sleep for the period in step S407, the loop of the steps S404, S407, and S403 is repeated later. In the present embodiment, when the loop of the steps S404, S407, and S403 is repeated, the sound-IF demodulator 200 may be switched to the sub-carrier detection mode.

To sum up, the sound-IF detecting method of the sound-IF demodulator is provided according to the above-described embodiments consistent with the present invention. The idle hardware, such as the second demodulator unit when the setting of the sound-IF demodulator is mismatched with the received sound signal (audio signal), is programmed to detect what standard the sound signal is in, so that the sound-IF demodulator is programmed to demodulate the sound signal in the 5 corresponding standard according to the detecting result. Meanwhile, while the corresponding detecting mode proceeds, the sound paths of the second demodulating unit respectively coupled to the first demodulating unit and the sound dematrix are cut. Accordingly, the demodulating process in the first demodulating unit is not affected by the detecting process in the second demodulating unit. Therefore, the sound-IF demodulator is recovered from mismatched setting without additional hardware through the provided sound-IF detecting method, and further, additional cost for detecting is unnecessary.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A sound intermediate frequency (sound-IF) demodulator, adapted for an analog television (analog-TV) system and receiving a sound signal having at least one of a first carrier signal and a second carrier signal, wherein a sound de-matrix unit is adapted to generate a driving signal by de-matrixing outputs of the sound-IF demodulator, the sound-IF demodulator comprising:
   a first demodulating unit generating a first demodulated signal to the sound de-matrix unit by demodulating the first carrier signal; and
   a second demodulating unit detecting a signal quality of the sound signal and generating a second demodulated signal to the sound de-matrix unit and/or the first demodulating unit by demodulating the second carrier signal,
   wherein when the second demodulating unit is idle, the second demodulating unit is programmed to select a corresponding standard among a plurality of predetermined standards for the sound signal according to the signal quality of the sound signal, so that the sound-IF demodulator is programmed to demodulate the sound signal in the corresponding standard; and
   wherein the second demodulating unit comprises a first testing unit to detect a signal-to-noise ratio (SNR) and power of the first carrier signal and the second demodulator becomes idle when the SNR of the first carrier signal is larger than a first SNR threshold and the power of the first carrier signal is smaller than a power threshold.

2. The sound-IF demodulator as claimed in claim 1, wherein the second demodulating unit comprises the first testing unit to detect a signal-to-noise ratio (SNR) of the second carrier signal.

3. The sound-IF demodulator as claimed in claim 2, wherein the second demodulating unit further comprises a second testing unit to detect a bit error rate (BER) of the second carrier signal.

4. The sound-IF demodulator as claimed in claim 3, wherein the second demodulator becomes idle when the SNR of the second carrier signal is smaller than the first SNR threshold or the BER of the second carrier signal is larger than a first BER threshold.

5. The sound-IF demodulator as claimed in claim 4, wherein sound paths of the second demodulating unit respectively coupled to the first demodulating unit and the sound de-matrix unit are cut when the second demodulator becomes idle.

6. The sound-IF demodulator as claimed in claim 5, wherein the corresponding standard is selected, and the cut sound paths of the second demodulating unit are respectively connected to the first demodulating unit and the sound de-matrix unit when the SNR of the second carrier signal is larger than a second SNR threshold or the BER of the second carrier signal is smaller than a second BER threshold.

7. The sound-IF demodulator as claimed in claim 4, wherein the corresponding standard is selected when the SNR of the second carrier signal is larger than a second SNR threshold or the BER of the second carrier signal is smaller than a second BER threshold.

8. The sound-IF demodulator as claimed in claim 7, wherein the first BER threshold is larger than the second BER threshold, and the second SNR threshold is larger than the first SNR threshold.

9. The sound-IF demodulator as claimed in claim 1, wherein sound paths of the second demodulating unit respectively coupled to the first demodulating unit and the sound de-matrix unit are cut when the second demodulator becomes idle.

10. The sound-IF demodulator as claimed in claim 7, wherein the corresponding standard is selected and the cut sound paths of the second demodulating unit are respectively connected to the first demodulating unit and the sound de-matrix unit when the SNR of the second carrier signal is larger than the second SNR threshold.

11. The sound-IF demodulator as claimed in claim 7, wherein the corresponding standard is selected when the SNR of the second carrier signal is larger than the second SNR threshold.

12. A sound intermediate frequency (sound-IF) detecting method of a sound-IF demodulator, the sound-IF detecting method comprising:

receiving a sound signal having at least one of a first carrier signal and a second carrier signal;

detecting a signal quality of the sound signal; and selecting a corresponding standard among a plurality of predetermined standards for the sound signal according to the signal quality of the sound signal when the signal quality meets a idle condition, so that the sound-IF demodulator is programmed to demodulate the sound signal in the corresponding standard, wherein the corresponding standard is selected when a SNR of the second carrier signal is larger than a second SNR threshold.

13. The sound-IF detecting method as claimed in claim 12, wherein the signal quality meets the idle condition when a signal-to-noise ratio (SNR) of the second carrier signal is smaller than a first SNR threshold or a bit error rate (BER) of the second carrier signal is larger than a first BER threshold.

14. The sound-IF detecting method as claimed in claim 13, wherein the corresponding standard is selected when the SNR of the second carrier signal is larger than the second SNR threshold or the BER of the second carrier signal is smaller than a second BER threshold.

15. The sound-IF detecting method as claimed in claim 14, wherein the first BER threshold is larger than the second BER threshold and the second SNR threshold is larger than the first SNR threshold.

16. The sound-IF detecting method as claimed in claim 12, wherein the signal quality meets the idle condition when a signal-to-noise ratio (SNR) of the first carrier signal is larger than a first SNR threshold and a power of the first carrier signal is smaller than a power threshold.

* * * * *